July 7, 1953    J. L. NISBET    2,644,286
COTTON PICKING MACHINE

Filed March 15, 1951    3 Sheets-Sheet 1

INVENTOR.
John L. Nisbet
BY
Munson H Lane
ATTORNEY.

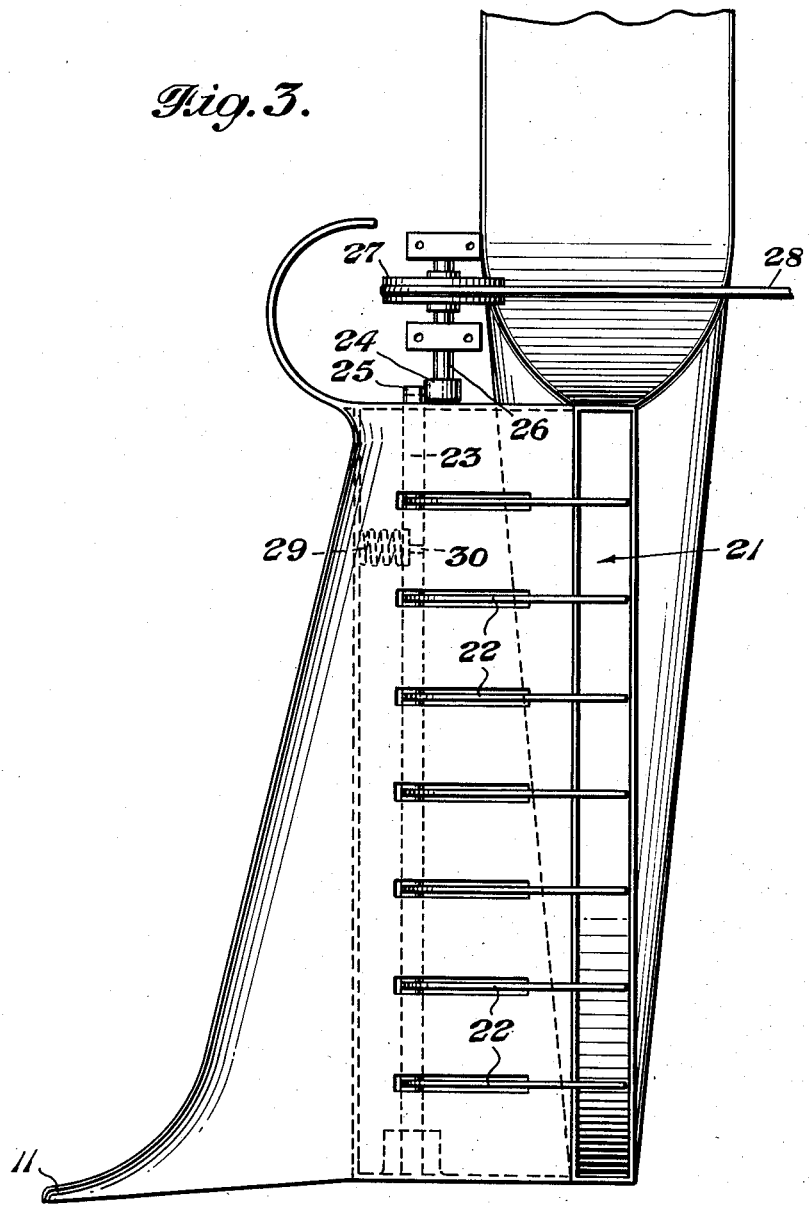

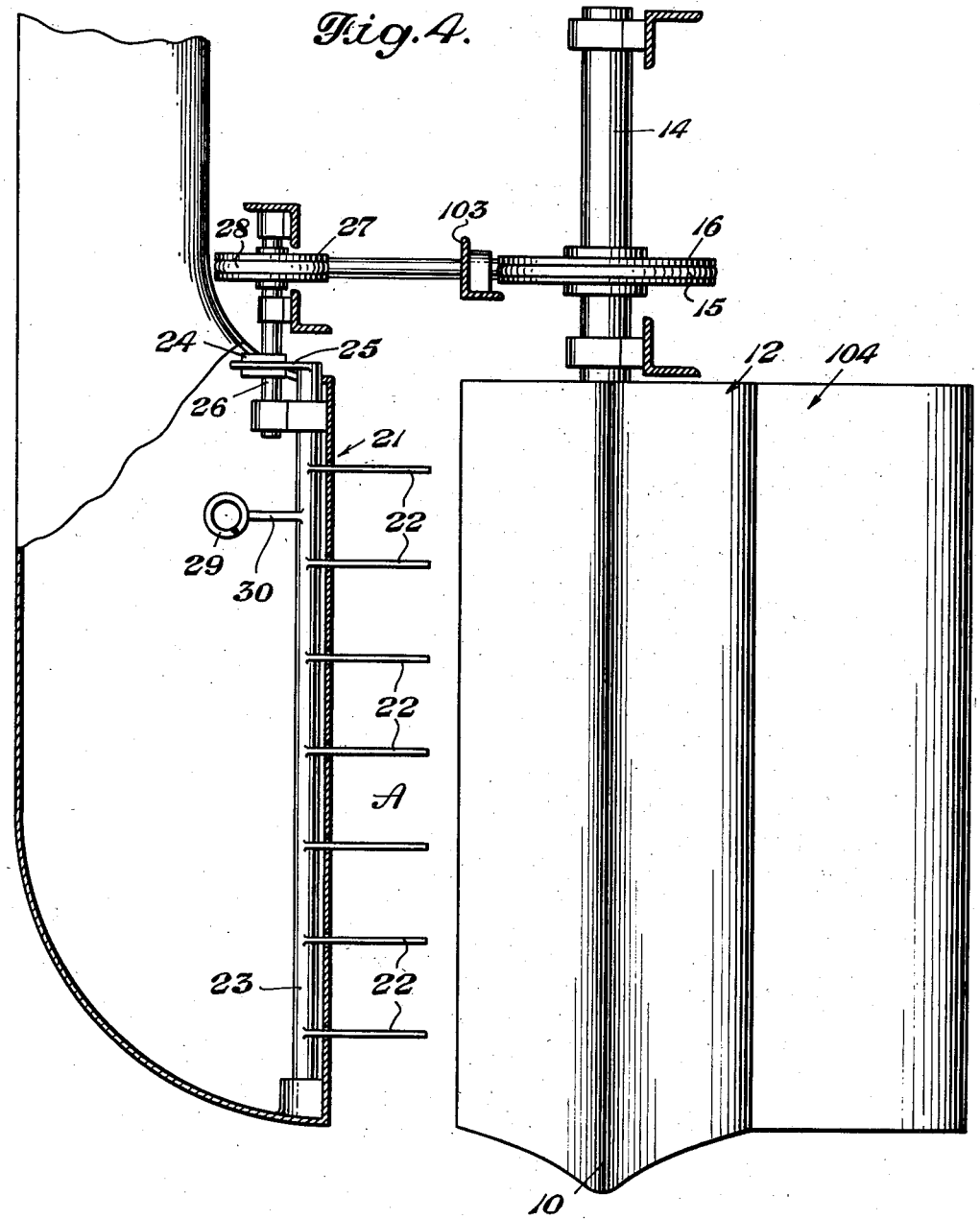

Patented July 7, 1953

2,644,286

UNITED STATES PATENT OFFICE 2,644,286

COTTON PICKING MACHINE

John L. Nisbet, San Angelo, Tex.

Application March 15, 1951, Serial No. 215,729

3 Claims. (Cl. 56—48)

The invention relates to improvements in cotton picking machines, and more particularly to improvements in agitating means, kickers or beaters designed primarily for use in connection with a cotton picking machine of the general type disclosed in the patent to A. R. Nisbet, Sr., No. 2,484,524, dated October 11, 1949, wherein a rotary toothed picker unit is mounted on the frame of a moving vehicle which is designed to be driven along a row of cotton plants, and which is provided with a fan or other means designed to blow the bolls of the cotton plant against the rotary saws of the picker unit, which saws remove the lint from the bolls without injury to the plants, the force of the air blast serving also to transfer the lint or cotton fiber to a receiving or storage container carried by the vehicle.

In accordance with the aforesaid Patent No. 2,484,524 the saws of the rotary picker unit are mounted on a central vertical shaft, and interposed between successive saws and located above the uppermost saw of the unit and below the lowermost saw of the unit where untoothed guard disks are secured to the central shaft and rotate with the saws, such disks being of slightly greater diameter than the saws and being designed to guard and protect the cotton plants themselves from injury permitting the lint to pass between the guard disks and to be engaged by the rotary saws by reason of the force of the air blast upon the bolls.

In the present disclosure guard members or fingers mounted on a fixed portion of the machine are disclosed, rather than the rotary guard disks disclosed in Patent No. 2,484,524, the stationary fingers having been found preferable to the rotary guard disks for many purposes. It will be understood, however, that the improvements of the present invention are applicable to a picker unit of the type disclosed in Patent No. 2,484,524, wherein the rotary guard disks are employed.

It has also been found desirable to reverse the direction of rotation of the picker unit as compared with that disclosed in Patent No. 2,484,524 (Fig. 4) so that the effective picking edges of the picker saws move in the same direction as do the cotton plants through the cotton passage of the picker as the vehicle is moved along a row of cotton plants.

In accordance with the disclosure of Patent No. 2,484,524 the picker unit is mounted at the inlet end of a cotton fiber transfer passage which intersects a plant passage extending lengthwise of the vehicle, the blower nozzle outlet being located on the opposite side of the plant passage from the picking unit. The air blast from said nozzle alone is relied upon to bend the cotton stalks and to force the cotton bolls against the saws of the picker unit, whereupon the cotton fibers are removed from the ripe cotton bolls by the teeth of the rotary saws, and after rotation of about 180° by the saws, the cotton fiber is blown off from the saw teeth through the cotton transfer passage to a place of storage by the force of the air blast from the nozzle.

I have found that more effective picking can be accomplished by supplementing the force of the air pressure by the use of mechanical agitators, kickers or beaters which are adapted to engage the trunks or main stems of each plant to move the same toward the picker unit, the air pressure being relied upon only for bending the branches of the plant and blowing the bolls against the picker unit. In this way a smaller amount of air pressure is required than where air pressure alone is relied upon for deflecting the stalks and presenting the bolls to the picker unit without the aid of mechanical agitators or the like.

The invention will be described in connection with a cotton picker of the general type disclosed in Patent No. 2,484,524, in which the cotton picking mechanism is carried by a moving vehicle, reference being had to said patent for a more detailed description of parts and mechanism coacting with the parts described and shown in the present application.

In the drawings:

Fig. 3 is a vertical section on line 3—3 of Fig. 2, but on a still larger scale, and with parts shown in elevation; and Fig. 4 is a section on line 4—4 of Fig. 2, with parts in elevation.

Figure 1:
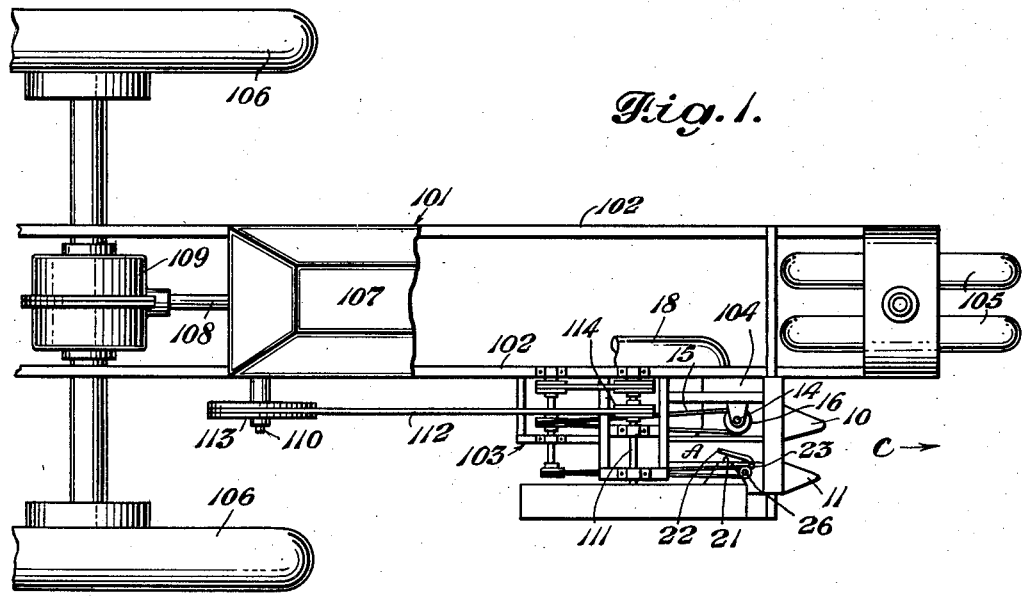
Fig. 1 is a fragmentary plan view with parts broken away showing the improved cotton picking mechanism mounted on a machine of the type shown in Patent No. 2,484,524.
Figure 2:
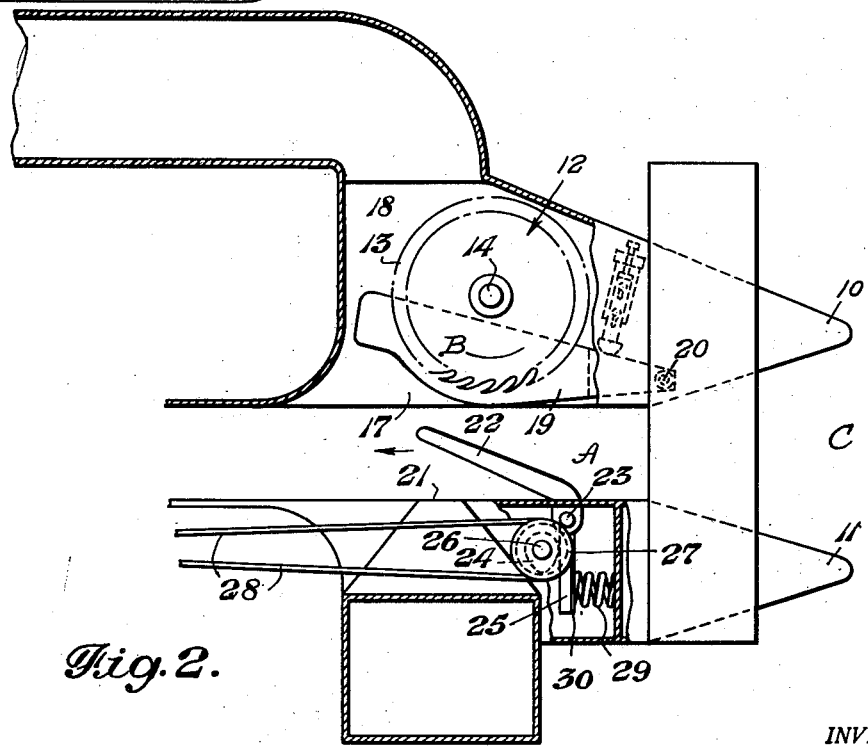
Fig. 2 is a plan view on a larger scale than Fig. 1, with parts in section, showing the cotton picking mechanism.

The picker is shown applied to a tractor 101 which is shown in outline only and needs but a brief explanation. The numeral 102 represents longitudinal bars constituting portions of the frame of the tractor; 103 denotes a portion of the frame of the picker, and the numeral 104 denotes casing parts which support and enclose portions of the picker. In the present construction, as also in Patent No. 2,484,524, the casing 104 is more in the nature of a supporting frame for the various parts of the picker than an enclosing housing, and it may be and preferably is, open through a substantial portion of its bottom and front end to allow the air blast to flow freely therethrough and to permit trash and foreign material to pass from the picker, and in this respect the casing 104 differs from the fluidtight conduits required where suction as distinguished from an air blast is relied upon to bring the bolls into contact with the picking unit, to remove the lint therefrom, and to transfer the picked cotton to a container or receptacle.

The tractor may be one of a well known type having front supporting and steering wheels 105, rear supporting and driving wheels 106, a suitable body 107 in which an internal combustion or other suitable motor may be enclosed, a propeller shaft 108 driven by the motor, and a differential gearing 109 through which the rear wheels are driven from the propeller shaft. The numeral 110 denotes a power take-off shaft suitably driven from the tractor motor, and 111 denotes a countershaft suitably driven therefrom, as by a belt 112 passing about pulleys 113 and 114, from which countershaft the operating parts of the picker are driven.

As shown, the cotton picking machine includes a pair of forwardly directed inclined guides or gathering members 10 and 11 which are adapted to direct the cotton plants into a plant passage A extending lengthwise of the machine from end to end thereof, so that as the vehicle on which the cotton picking mechanism is carried is advanced along a row of cotton plants the plants of said row will pass through the plant passage. The cotton picking mechanism comprises a rotating picking unit 12 comprising a plurality of spaced saws 13 mounted on a vertical shaft 14 journaled in suitable bearings and adapted to be rotated in the direction of the curved arrow B by means of a belt or the like 15 coacting with a a suitable pulley 16 secured to the shaft 14. It will be noted that the picker unit 12 is mounted at the inlet portion 17 of a fiber transfer passage 18 which leads to a suitable receiving or storage container (not shown) carried by the frame of the vehicle on which the cotton picking mechanism is mounted. When the vehicle is moved forwardly in the direction of the arrow C the relative movement of the cotton plant through the plant passage A will be in the opposite direction, and the curved teeth of the saws of the cotton picking unit adjacent the plant passage A will be in the same direction as the movement of the plants through the passage, thereby minimizing injury to the plants. As shown, guard fingers 19 are provided for the saws 13, such fingers being arranged between successive saws and extending across the inlet portion 17 of the cotton transfer passage, said guard fingers being bulged outwardly intermediate their ends so as to extend beyond the curved teeth of the saws of the picking unit at the picking edge thereof. As shown, the guard fingers are mounted on a vertical shaft 20 located in advance of the picker unit 12, the guard fingers extending rearwardly from the shaft 20 in a direction generally paralleling the walls of the plant passage A and some at least of the fingers projecting beyond the saws nearly to the further wall of the fiber transfer passage, so as to prevent plants from being drawn thereinto.

Located across the plant passage A from the picker unit is a blower nozzle 21 which is adapted to direct a blast of air across the plant passage A so as to force the cotton bolls of the plants in said passage into picking relation to the picker unit.

In accordance with the present invention the force of the air blast is supplemented by mechanical agitating devices, kickers or beater 22 in moving the cotton to the picking postion, such devices also providing agitation to loosen the cotton on the boll, thus making it easier for the saws of the picker unit to remove the cotton fibers. As shown, the agitating devices 22 are in the form of fingers carried by an oscillatable vertical shaft 23 mounted adjacent the plant passage A and slightly forward of the outlet of the blower nozzle 21. These agitating fingers normally extend diagonally rearwardly and outwardly from the shaft and part way across the plant passage A. These fingers are adapted to engage the main trunks or stalks of plants in the plant passage A and to incline or direct them toward the picker unit. The shaft 23 carrying the agitating fingers 22 is adapted to be oscillated at predetermined intervals in opposite directions whereby a kicking movement is imparted to the fingers 22. As shown, oscillation in a direction to move the fingers rearwardly from the normal position toward the nozzle outlet may be imparted to the shaft 23 by means of a cam 24 which, at suitable intervals, engages an arm 25 carried by the shaft 23. The cam 24 is shown as carried at the lower end of a vertical shaft 26 adapted to be slowly rotated by means of a pulley 27 driven by belts 28 actuated from any suitable source of power. Quick return or kicking movement is imparted to the shaft 23 and agitators 22 by means of a spring 29 engaging an arm 30 carried by the shaft 23, the spring being compressed by the arm 30 as the shaft 23 is rotated by engagement of the cam 24 with the upper arm 25 carried by the shaft 23. When the cam is disengaged from the arm the spring returns the fingers 22 rapidly to the normal inclined position indicated in full lines in Fig. 1 of the drawing, and in so doing imparts a sharp kicking movement to the stalks of cotton carrying the cotton bolls.

The invention has been described in detail for the purpose of illustration but it will be obvious that numerous modifications and variations may be resorted to without departing from the spirit of the invention.

I claim:

1. In a cotton picking machine adapted to pass lengthwise along a row of growing plants, said machine having a plant passage extending lengthwise therethrough through which plants of a row are adapted to pass as the machine is moved along the row, and having a cotton transfer passage intersecting the plant passage, a rotary toothed picker located at the inlet of the transfer passage adjacent the plant passage from said picker unit having a blower nozzle outlet arranged to direct an air blast transversely of the plant passage for blowing bolls of cotton against the picker unit; the improvement wherein mechanical means are provided to assist the air blast in presenting the bolls to the picker unit comprising a series of vertically spaced fingers mounted on the same side of the air passage as the air blast nozzle outlet, and extending in a rearwardly inclined direction partially across the plant passage, and means for periodically imparting a sudden kicking movement to the fingers for agitating and loosening the cotton in the bolls.

2. A cotton picking machine as set forth in claim 1 wherein the spaced vertically aligned fingers are mounted for oscillation about a vertical axis within the mouth of the blower nozzle.

3. A cotton picking machine as set forth in claim 1 wherein the spaced fingers are carried by a shaft mounted for oscillation within the mouth of the blower nozzle, and the means for imparting a sudden kicking movement to the fingers comprises a rigid projection carried by the vertical shaft, cam means adapted to periodically engage said projection for moving the fingers in one direction, and spring means for rapidly returning the fingers to their normal rearwardly inclined positions.

JOHN L. NISBET.

References Cited in the file of this patent

UNITED STATES PATENTS

| Number | Name | Date |
|---|---|---|
| 2,484,524 | Nisbet, Sr. | Oct. 11, 1949 |
| 2,489,551 | Wegner | Nov. 29, 1949 |